(12) United States Patent
Yang

(10) Patent No.: US 6,980,771 B1
(45) Date of Patent: Dec. 27, 2005

(54) CDMA WIRELESS COMMUNICATION SYSTEM INCLUDING FINITE IMPULSE RESPONSE FILTER AND PHASE EQUALIZER FOR INTER-CHIP INTERFERENCE REDUCTION

(75) Inventor: Hong Kui Yang, San Diego, CA (US)

(73) Assignee: VIA Technologies, Inc. of R.O.C., Taipei (TW)

( * ) Notice: Subject to any disclaimer, the term of this patent is extended or adjusted under 35 U.S.C. 154(b) by 394 days.

(21) Appl. No.: 10/033,799

(22) Filed: Jan. 3, 2002

(51) Int. Cl.$^7$ ................................................. H04B 1/10
(52) U.S. Cl. ..................... 455/63.1; 455/213; 455/504; 370/328; 370/335; 375/143; 375/144
(58) Field of Search ................................. 455/120, 422, 455/426, 522, 523, 114.2, 10, 575.1, 550.1, 455/24, 501, 506, 63.1, 562.1, 213, 504, 455/65, 307, 422.1, 423, 424, 425, 561, 432.1, 455/436, 442, 456.5, 456.6, 525, 67.11, 67.13, 455/135, 161.3, 293, 277.2, 295, 312, 337, 455/334, 339; 375/219, 316, 346, 146, 147, 375/211, 229, 295, 298, 350, 222, 231, 348, 375/261, 340, 343; 370/278, 282, 290, 315, 370/320, 312, 342, 335, 441, 510, 328, 206, 370/333, 516, 517, 280, 343; 329/302, 306, 329/320, 349, 350–351

(56) References Cited

U.S. PATENT DOCUMENTS

| | | | | |
|---|---|---|---|---|
| 5,896,306 | A | * | 4/1999 | Aschwanden ............... 708/300 |
| 6,031,866 | A | * | 2/2000 | Oler et al. .................. 375/219 |
| 6,282,184 | B1 | * | 8/2001 | Lehman et al. ............. 370/342 |
| 2003/0214926 | A1 | * | 11/2003 | Choi et al. .................. 370/335 |

* cited by examiner

*Primary Examiner*—Edward F. Urban
*Assistant Examiner*—Charles Chow
(74) *Attorney, Agent, or Firm*—Preston Gates & Ellis LLP

(57) ABSTRACT

A digital CDMA wireless communication system. The system includes one or more of said transmitters with a base station baseband processor, a finite impulse response (FIR) filter, a pre-distortion phase equalizer and a digital-to-analog (DAC) converter. Receivers have an analog-to-digital (ADC) converter, a FIR filter, a phase equalizer and a receiver baseband processor. The receiver FIR filter is matched to the transmitter FIR filter and the receiver phase equalizer is matched to the pre-distortion phase equalizer.

11 Claims, 1 Drawing Sheet

CDMA WIRELESS COMMUNICATION SYSTEM INCLUDING FINITE IMPULSE RESPONSE FILTER AND PHASE EQUALIZER FOR INTER-CHIP INTERFERENCE REDUCTION

CROSS REFERENCE TO RELATED APPLICATION

The present invention is related to U.S. patent application Ser. No. 10/033,642 entitled "DIRECT CONVERSION WIRELESS RECEIVER WITH DIGITAL PHASE EQUALIZATION" to H. Yang w et al.; filed concurrently herewith and assigned to the assignee of the present invention.

BACKGROUND OF THE INVENTION

1. Field of the Invention

The present invention is related to spread spectrum wireless communications and more particularly to code division multiple access (CDMA) wireless digital transmitters and receivers.

2. Background Description

Third generation (3G) mobile wireless technology devices communicate using a protocol known as code division multiple access (CDMA) wherein numerous signals occupy a single transmission channel. The 3G standard known as CDMA2000 promogated by the International Telecommunications Union (ITU) supports mobile data communications at speeds ranging from 144 Kbps to 2 Mbps. These high 3G data rates present designers with several problems. Transmitters for 3G devices include a transmission filter that is designed, primarily to meet emission requirements. For optimum performance it is desirable that the system receivers have a filter with a transfer function response that is matched to that of the transmitter's filter. Any mismatch between the transmitter filter and the receiver filter impacts the receiver effectiveness by reducing receiver signal noise ratio (SNR).

A typical CDMA2000 base station transmitter signal path includes a finite impulse response (FIR) filter followed by a pre-distortion phase equalizer. The pre-distortion phase equalizer leads to a simplified mobile receiver filter which is, by contrast, a fifth order or sixth order elliptic filter. However, since the frequency response of the standard transmitter's FIR filter and predistortion equalizer cannot be matched to the frequency response of the fifth or sixth order elliptic filter, the SNR cannot be maximized for the CDMA2000 systems using current receiver designs.

Also, what is known as Inter-Chip Interference (ICI) occurs when reflected signals are delayed long enough that successive bits (or chips) in the demodulated signals overlap, creating uncertainty in the receiver data. Second generation and older systems with larger signals transmitted at a lower data rate (i.e., for voice and other low data rate applications) could tolerate this lower SNR. Unfortunately, at the higher packet speed 3G data rates and beyond (1–5 Mbps) and smaller signals that use 16 or 64 bit quadrature amplitude modulation (QAM), these same filter mismatches cause an intolerable SNR increasing ICI in the receiver, i.e., on the order of 3 dB, and impact receiver performance. For backward compatibility, the same baseband filter in existing IS95/CDMA2000 systems filter high speed data packets. As a result, the current IS95/CDMA2000 based mobile baseband processor suffers from very high ICI in high speed data packets and significantly degraded system performance.

Thus, there is a need for a wireless receiver with improved signal to noise ratio that is less sensitive to inter-chip interferences.

BRIEF DESCRIPTION OF THE INVENTION

It is a purpose of the invention to reduce wireless receiver Inter-chip Interference and improve signal to noise ratio.

The invention is a wireless communications with significantly reduced receiver inter-chip interference (ICI). The system including one or more of said transmitters with a base station baseband processor, a finite impulse response (FIR) filter, a pre-distortion phase equalizer and a digital-to-analog (DAC) converter. Receivers have an analog-to-digital (ADC) converter, a FIR filter, a phase equalizer and a receiver baseband processor. The receiver FIR filter is matched to the transmitter FIR filter and the receiver phase equalizer is matched to the pre-distortion phase equalizer.

BRIEF DESCRIPTION OF THE DRAWINGS

The present invention is illustrated by way of example and not limitation the accompanying figures in which like references indicate similar elements and which.

DESCRIPTION OF PREFERRED EMBODIMENTS

Figure 1:
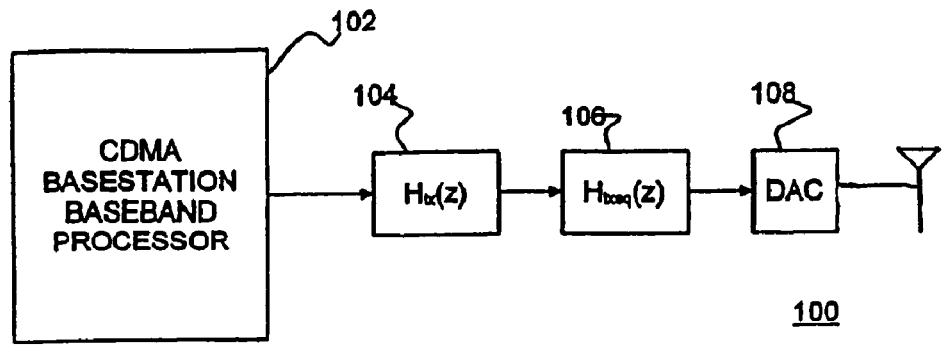
FIG. 1 shows a block diagram of an example of a preferred transmitter circuit for code division multiple access (CDMA) digital wireless transmission.

Turning now to the drawings and, more particularly, FIG. 1 shows a block diagram of an example of a transmitter circuit 100 for code division multiple access (CDMA) digital wireless transmission according to a preferred embodiment of the present invention. Information, e.g., voice, video or data, is encoded in a typical CDMA base station baseband processor 102. The output of the CDMA base station baseband processor 102 is passed to a finite impulse response (FIR) filter 104 with transfer function $H_{tx}(z)$. The output of the FIR filter is passed to a pre-distortion phase equalizer 106 which has a transfer function $H_{txeq}(z)$. The output of the pre-distortion phase equalizer is passed to a digital to analog converter (DAC) 108, which converts the digital signal to analog for transmission. The analog output of the DAC 108 modulates a carrier ($\omega_0$) and, the modulated carrier is transmitted as a RF signal.

Figure 2:
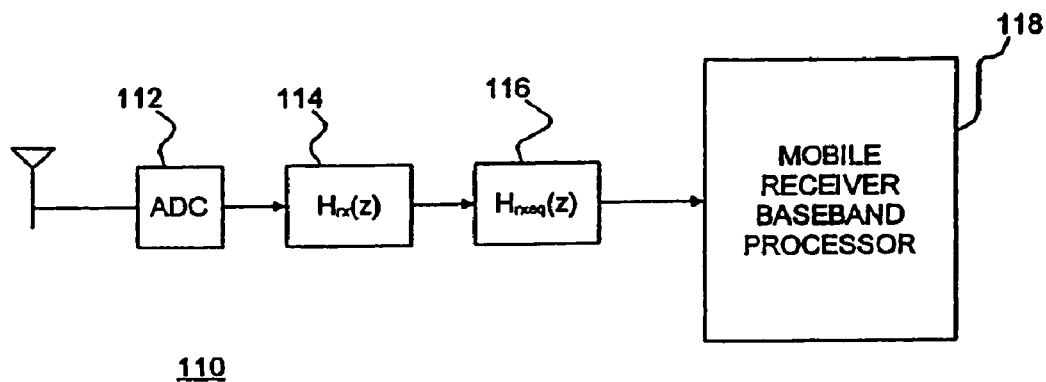
FIG. 2 is a block diagram of an example of a preferred receiver circuit with a frequency response matched to the transmitter circuit of FIG. 1.

FIG. 2 is a block diagram of an example of a receiver circuit 110 with a frequency response matched to the transmitter circuit 100 frequency response according to a preferred embodiment of the present invention. An RF input signal is down converted to quadrature baseband signals (i.e., real and imaginary) and each signal phase is provided to an identical parallel path, one of which is shown. Each quadrature baseband signal is passed to an analog to digital converter (ADC) 112. The output of the ADC 112 is passed to a FIR filter 114, which has a transfer response ($H_{rx}(z)$) that is matched to the transmitter FIR 104 frequency response as described hereinbelow. The output of the receiver FIR 114 is passed to a phase equalizer 116, that has a frequency response ($H_{rxeq}(z)$) that is matched to the pre-distortion phase equalizer 106 (in this example, they are identical) also described hereinbelow. The output of the phase equalizer 116 is passed to a mobile receiver baseband processor 118, where both quadrature signal paths converge and the transmitted information is extracted. By virtue of transmitter and receiver filters being matched, ICI is minimized in the preferred embodiment receiver.

So, to minimize ICI, the circuit response ($H(z)$) for the path, from processor 102 to processor 118, must have a linear phase and flat amplitude in band and must satisfy ($H(z)=H_{tx}(z)H_{txeq}(z)H_{rx}(z) H_{rxeq}(z)$). Using this equivalent path response, $H(z)$, the frequency response for each of the FIR filters 104, 114 and each of the phase equalizers 106, 116 may be determined. Further, by defining the transmitter FIR 104 and pre-distortion phase equalizer 106, the receiver FIR filter 114 and phase equalizer 116 are defined and vice versa. So, for example, presently a FIR filter and pre-distortion equalizer are defined by IS95/CDMA2000 for state of the art CDMA systems.

Figure 3:
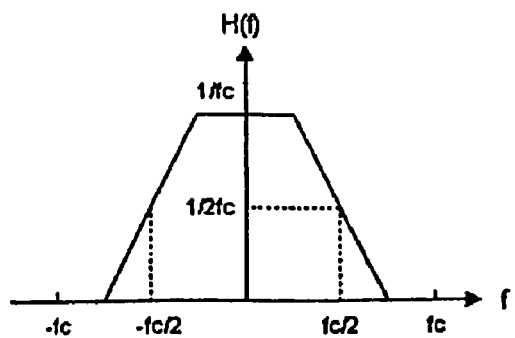
FIG. 3 shows a transfer function example for H(z) wherein FIR filters are constrained to $H_{rxeq}(z)=H_{txeq}(z^{-1})$ in the z-domain, such that $|H_{tx}(z) H_{rx}(z)|$ has linear phase and odd symmetry about half the inter-chip frequency ($f_c/2$).

In particular, FIG. 3 shows a transfer function example for $H(z)$ wherein FIR filters 104, 114 are constrained to $H_{rxeq}(z)=H_{txeq}(z^{-1})$ in the z-domain, such that $|H_{tx}(z)H_{rx}(z)|$ has linear phase and odd symmetry about the frequency fc/2, where fc is the inter-chip frequency. Since the CDMA2000 standard transmission FIR filter 104 has a transfer response ($H_{tx}(z)$) with on the order of 2 dB peak-to-peak ripple, to satisfy $H(z)$, the corresponding resulting complementary receiver filter 114 must have a transfer response ($H_{rx}(z)$) with reverse in-band ripple. So, the combined response of the transmitter FIR filter 104 and receiver FIR filter 114 must have a flat amplitude in-band response and at least 6 dB rejection at fc/2. Using a typical state of the art mathematical tool, such as Matlab from The Mathworks, Inc., multiplierless coefficients may be generated for the receiver FIR filter 114, wherein FIR filter 104 is a CDMA2000 standard transmission FIR filter.

The CDMA2000 standard defines the transmitter pre-distortion phase equalizer 106 in the S-domain. Therefore, to satisfy $H(z)$ the receiver phase equalizer 116 must satisfy $H_{rxeq}(s)=H_{txeq}(-s)$ which transfers to the z domain as $H_{rxeq}(z)=H_{txeq}(z^{-1})$. Accordingly, the receiver phase equalizer 116 may be implemented at 2, 4 or 8 times fc, as a transfer function in z-domain, $H_{eq}(z)$, where $$H_{eq}(z) = \frac{b_0 + b_1 z^{-1} + b_2 z^{-2}}{a_0 + a_1 z^{-1} + a_2 z^{-2}}$$

and $a_0=b_2$, $a_1=b_1$ and $a_2=b_0$. Again using Matlab, multiplierless coefficients may be generated at each of the above frequencies to provide, for example:

at 2fc: a0=33, a1=−110, a2=128,
at 4fc: a0=36, a1=−92, a2=64, and
at 8fc: a0=194, a1=−441, a2=256.

While the invention has been described in terms of preferred embodiments, those skilled in the art will recognize that the invention can be practiced with modification within the spirit and scope of the appended claims.

What is claimed is:

1. A digital CDMA wireless communication system conforming to CDMA2000 standard comprising:

a plurality of transmitters, one or more of said transmitters comprising a base station baseband processor, a finite impulse response (FIR) filter, a pre-distortion phase equalizer and a digital-to-analog (DAC) converter;

a plurality of receivers, one or more of said receivers comprising an analog to digital (ADC) converter, a FIR filter, a phase equalizer and a receiver baseband processor; and said receiver FIR filter being matched to said transmitter FIR filter and said receiver phase equalizer is matched to said pre-distortion phase equalizer.

2. A wireless CDMA communication system as in claim 1 wherein said transmitter FIR filter and said receiver FIR filter are constrained such that $|H_{tx}(z) H_{rx}(z)|$ has linear phase and odd symmetry about half the inter-chip frequency ($f_c/2$).

3. A digital CDMA wireless communication system as in claim 1 wherein the transmitter predistortion phase equalizer and said receiver phase equalizer are constrained to $H_{rxeq}(z)=H_{txeq}(z^{-1})$ in the z domain.

4. A digital CDMA wireless communication system as in claim 3 wherein each of the predistortion phase equalizer and the receiver phase equalizer has a transfer function of $$H_{eq}(z) = \frac{b_0 + b_1 z^{-1} + b_2 z^{-2}}{a_0 + a_1 z^{-1} + a_2 z^{-2}}$$

where $a_0=b_2$, $a_1=b_1$, and $a_2=b_0$.

5. A wireless CDMA communication system as in claim 4 wherein said transmitter FIR filter and said receiver FIR filter are constrained such that $|H_{tx}(z) H_{rx}(z)|$ has linear phase and odd symmetry about half the inter-chip frequency ($f_c/2$).

6. A digital CDMA wireless communication system as in claim 5 wherein the circuit response ($H(z)$) for the path from said base station baseband processor in said one or more transmitter to said receiver baseband processor has a linear phase and flat amplitude in-band such that ($H(z)=H_{tx}(z)H_{txeq}(z)H_{rx}(z)H_{rxeq}(z)$).

7. A digital CDMA wireless communication system as in claim 1 wherein the circuit response ($H(z)$) for the path from said base station baseband processor in said one or more transmitter to said receiver baseband processor has a linear phase and flat amplitude in-band such that ($H(z)=Htx(z)Htxeq(z)Hrx(z)Hrxeq(z)$).

8. A wireless remote receiver conforming to CDMA2000 standard comprising:

an analog to digital (ADC) converter;
a receiver finite impulse response (FIR) filter;
a phase equalizer, and
a receiver base band processor,
wherein the FIR filter is matched to a transmitter FIR filter and the receiver phase equalizer is matched to a pre-distortion phase equalizer in a base station for reducing an Inter-Chip Interference caused by distortion introduced by the transmitter FIR filter and pre-distortion phase equalizer in the base station.

9. The receiver as in claim 8 wherein said transmitter FIR filter and said receiver FIR filter are constrained such that $|H_{tx}(z) H_{rx}(z)|$ has linear phase and odd symmetry about half the inter-chip frequency ($f_c/2$).

10. The receiver as in claim 8 wherein the pre-distortion phase equalizer and said receiver phase equalizer are constrained to $H_{rxeq}(z)=H_{txeq}(z^{-1})$ in the z domain.

11. The receiver as in claim 8 wherein said transmitter FIR filter and said receiver FIR filter are constrained such that $|H_{tx}(z) H_{rx}(z)|$ has linear phase and odd symmetry about half the inter-chip frequency ($f_c/2$).

* * * * *